United States Patent [19]

Lanzer

[11] Patent Number: 4,712,448
[45] Date of Patent: Dec. 15, 1987

[54] DRIVE MECHANISM FOR MOTOR VEHICLES HAVING TWO DRIVE AXLES

[75] Inventor: Heribert Lanzer, Gössendorf, Austria

[73] Assignee: Steyr-Daimler-Puch AG, Vienna, Austria

[21] Appl. No.: 772,128

[22] Filed: Aug. 30, 1985

[30] Foreign Application Priority Data

Aug. 30, 1984 [AT] Austria .................... 2781/84

[51] Int. Cl.[4] .................................. F16H 37/08
[52] U.S. Cl. .................... 74/665 GC; 74/701; 74/710.5; 180/247; 180/250
[58] Field of Search ............ 74/701, 710.5, 665 GC; 180/250, 249, 248, 247

[56] References Cited

U.S. PATENT DOCUMENTS

| 2,874,790 | 2/1959 | Hennessey | 180/6.2 |
| 3,420,120 | 1/1969 | Burtner | 74/711 |
| 4,417,642 | 11/1983 | Suzuki et al. | 180/249 |
| 4,428,452 | 1/1984 | Muraoka et al. | 180/249 |
| 4,441,575 | 4/1984 | Suzuki | 180/248 |
| 4,476,952 | 10/1984 | Suzuki | 74/701 X |
| 4,476,953 | 10/1984 | Hiraiwa | 180/249 |
| 4,541,503 | 9/1985 | Akutagawa et al. | 180/247 X |
| 4,562,897 | 1/1986 | Renneker | 180/247 X |
| 4,577,721 | 3/1986 | Ashikawa | 180/248 |

FOREIGN PATENT DOCUMENTS

| 269581 | 10/1919 | Fed. Rep. of Germany . |
| 314933 | 1/1927 | Fed. Rep. of Germany . |
| 845904 | 6/1962 | Fed. Rep. of Germany . |
| 58-30834 | 2/1983 | Japan | 180/247 |
| 58-63525 | 4/1983 | Japan | 180/248 |
| 58-63524 | 4/1983 | Japan | 180/248 |
| 1010323 | 11/1965 | United Kingdom . |
| 1022551 | 3/1966 | United Kingdom . |
| 1357106 | 6/1974 | United Kingdom . |

Primary Examiner—Lawrence Staab
Assistant Examiner—Dwight G. Diehl
Attorney, Agent, or Firm—Marmorek, Guttman & Rubenstein

[57] ABSTRACT

A drive mechanism for motor vehicles having two drive axles is disclosed. The drive mechanism includes a transmission drive followed by a differential gear unit. The differential gear unit includes first and second driven members. The first driven member is drivingly connected to the first drive axle and, via a spur gear drive system, to a first set of friction plates in a fluid friction clutch unit. The second driven member is drivingly connected to the second drive axle and, also via a spur gear drive system, to a second set of friction plates in a fluid friction clutch unit. The first set of plates and the second set of plates of the clutch unit are frictionally coupled to each other and thus act to equalize the rotational speeds of the two drive axles.

To enhance the operation of the drive mechanism, the spur gear drive system connecting the driven members to the clutch unit provides a gear ratio greater than one. In order to make the fluid frictional clutch unit easily replaceable, it is constructed as a modular unit and is located externally of the differential gear unit.

5 Claims, 1 Drawing Figure

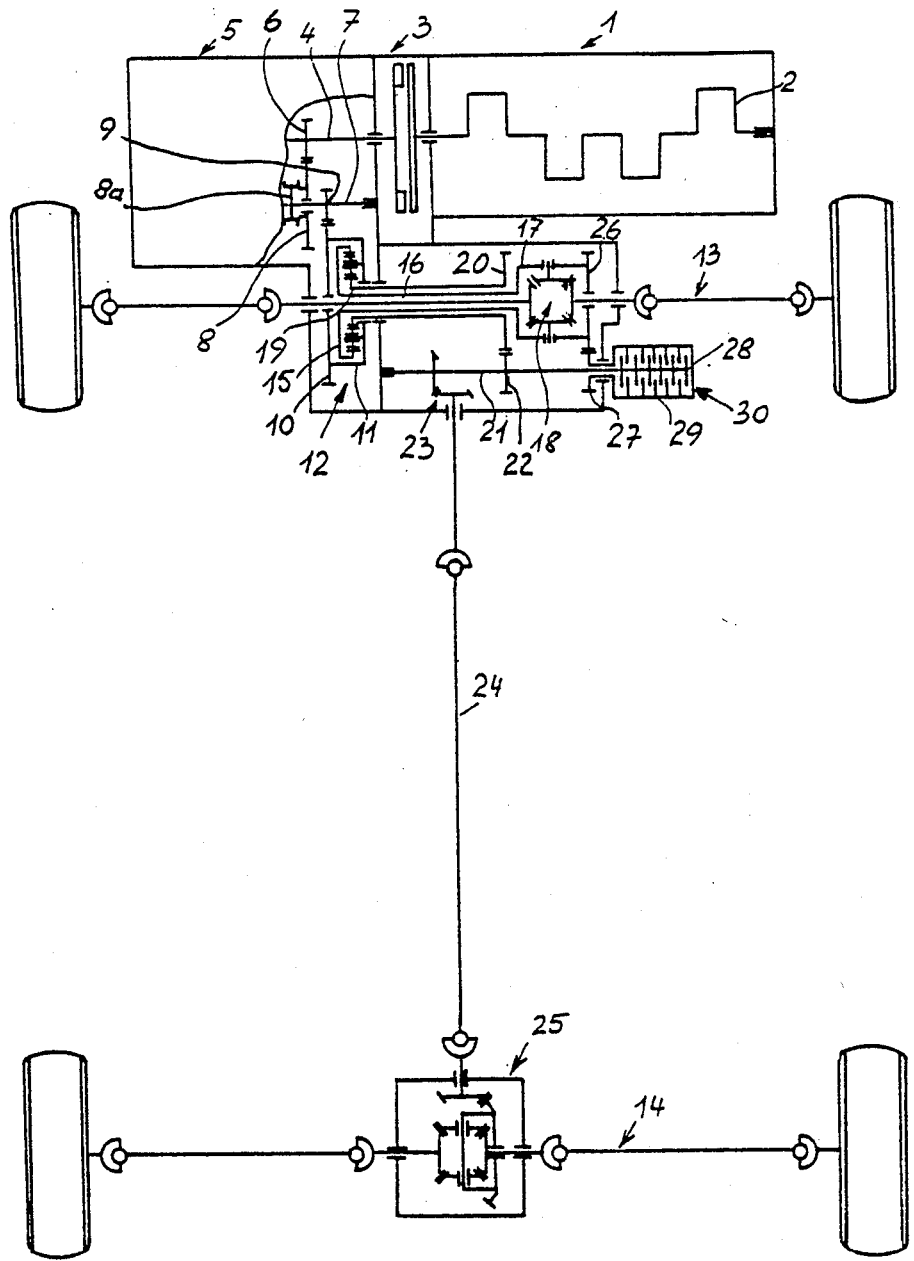

DRIVE MECHANISM FOR MOTOR VEHICLES HAVING TWO DRIVE AXLES

BACKGROUND OF THE INVENTION

This invention relates to a drive mechanism for motor vehicles having two drive axles. More particularly, this invention relates to a drive mechanism having a differential and distributing gear unit following a transmission drive. The differential gear unit includes two rotatably driven members. Each of the two rotatable driven members drives one of the drive axles while frictionally coupled plates of a fluid friction clutch are associated with each of the driven members.

As is well known, a fluid friction clutch comprises sets of inner and outer plates which are connected to corresponding plate carriers. The plates and plate carriers are enclosed within a housing which is filled with a liquid having a high viscosity. The inner and outer plates, or their plate carriers, are coupled in rotation to each other by means of this liquid.

The two sets of elements of the fluid friction clutch are in turn connected and fixed in rotation to two output or driven members of a differential gearing unit. If there occurs a relative movement between the driven members of the differential gearing unit, for example, if one set of the wheels begins to slip, this relative movement is opposed by the fluid friction coupling with a torque which depends on the differential speed of rotation. This frictional torque then acts as a brake on the particular driven member of the differential gearing unit which is rotating at higher speed. The frictional torque arises from the shearing stress applied to the working fluid in the fluid frictional clutch when the driven members of the differential gearing unit drive the inner and outer sets of plates or elements at different speeds.

Self-locking differential gearing arrangements are already known and have proved themselves effective under actual working conditions. Hitherto, however, the fluid friction clutch unit has been integrated directly into the differential gearing units. Thus, for example, in one known embodiment, the outer plate carrier has been directly connected to the differential gearing housing, while the inner plate carrier has been directly connected to one of the output beveled shafts of the differential gearing unit. Consequently, the frictional torque provided by the fluid friction clutch unit has been of the same magnitude as that generated within the differential gearing unit itself. If only low rotational speeds are utilized within the differential gearing unit, it is necessary for the fluid friction clutch unit to be of a relatively large size in order to provide effective frictional torque. Moreover, in such known self-locking gearing units, it has been difficult to replace one frictional clutch unit with another having different characteristics in order to give the motor vehicle different driving characteristics because the fluid frictional clutch unit has been integrated into the differential gear unit.

British Patent No. 1,357,106, which is incorporated herein by reference, discloses a driving mechanism containing such a self-locking differential gearing unit for motor vehicles having two drive axles. The drive mechanism of this reference includes a fluid friction clutch which is integrated into a differential and distributing gearing unit. Thus, the two sets of frictional elements of the fluid friction clutch are directly connected to the driven members of the differential gear unit. As a result, this drive mechanism suffers from the disadvantage mentioned above.

In German patent document DE-PS No. 845,904, another drive mechanism for motor vehicles is disclosed. In this drive mechanism, an electromagnetic slip brake is coupled to a differential gearing unit and to the drive axle. A gearing system is located between the differential gearing unit and the electromagnetic slip brake. This gearing system provides a gear ratio greater than one in order to increase the rotational speed transmitted by the differential gearing unit. However, as is well known to those skilled in the art, a slip brake is completely different and has completely different characteristics from a fluid friction clutch.

It is therefore an object of the present invention to overcome the deficiencies mentioned above and to provide a drive mechanism for motor vehicles having two drive axles and a fluid friction clutch disposed between the differential gearing unit and the drive axles. It is also an object of the present invention to provide such a fluid friction clutch unit which is of a modular construction and is easily replaceable. It is also an object of the present invention to provide a fluid friction clutch unit which can be replaced by other fluid friction clutch units of different sizes and having different characteristics.

SUMMARY OF THE INVENTION

These and other objects are accomplished by means of the present invention which provides a drive mechanism for motor vehicles having two drive axles. The inventive drive mechanism comprises a transmission drive for changing speeds, a differential gear unit following the transmission drive, and a fluid friction clutch unit. The differential gear unit includes first and second rotatably driven members which drive the first and second drive axles. The fluid friction clutch unit contains first and second sets of elements which are frictionally coupled to each other. The first set of elements is associated with the first driven member and the second set of elements is associated with the second driven member. A spur gear drive system is also provided to connect the first and second driven members of the differential gear units with the first and second sets of elements in the fluid friction clutch unit.

The fluid friction clutch unit is constructed as a modular unit which is not integrated into the differential gear unit. Thus, the fluid frictional clutch unit can easily be exchanged for another unit. In addition, the spur gear drive system disposed between the driven members and the fluid frictional clutch unit provides a gear ratio of greater than one in order to drive the first and second sets of frictional elements in the clutch unit at speeds greater than those of the driven members of the differential unit.

Since the fluid friction clutch unit is not integrated into the differential gearing unit, but is separate and located at a distance remote from the differential gearing unit, it is possible to replace the fluid friction clutch with another having different characteristics and thereby to give the motor vehicle different driving characteristics. Furthermore, the two sets of coupled elements in the fluid friction clutch unit rotate at speeds higher than those of the driven members of the differential gearing unit. As a result, the difference in speed between the first and second sets of elements in the fluid friction clutch unit is many times greater than the difference in rotational speed between the two driven members of the differential gear units. The blocking torque in the fluid friction clutch unit is correspondingly smaller than the differential torque at the driven members of the differential gearing units. Consequently, the spur gear drive system enables one to employ a fluid friction clutch unit which is substantially smaller in size than clutch units used hitherto. In addition, as mentioned previously, the fluid friction clutch unit is not integrated into the differential gear unit and thus is not affected by the temperatures generated in the differential gear unit.

In a preferred embodiment, the drive mechanism comprises a differential gearing unit having shafts which lie transversely to the direction of travel. The differential gearing unit has a first driven member which is connected directly to a differential gear housing of one drive axle, and a second driven member which is connected via a spur gear drive system and an angle drive to a shaft leading to the other drive axle. A fluid friction coupling unit is disposed so that a first set of frictional elements is coupled to the shaft of a driven gear of the spur gear drive system, and the second set of frictional elements is coupled to the differential gear housing via a second spur gear drive system having the same transmission ratio as the first. This preferred embodiment permits the use of a fluid frictional clutch unit which is independent of the differential gearing units. It is external to the differential gearing units and allows easy accessibility, replaceability, and servicing. To replace the frictional clutch unit, it is merely necessary to detach it from the two spur gear drive systems.

BRIEF DESCRIPTION OF THE DRAWING

FIG. 1 illustrates in schematic form one preferred embodiment of the drive mechanism of the present invention. This mechanism aids in equalizing rotation of the wheels on the two drive axles.

DETAILED DESCRIPTION OF THE PREFERRED EMBODIMENT

Referring to FIG. 1, a preferred embodiment of the drive mechanism of the present invention is illustrated in schematic form. A motor 1, having a crankshaft 2 is illustrated lying transversely to the direction of travel of a motor vehicle having two drive axles. Via a shift clutch 3, a crankshaft 2 drives an input shaft 4 of a transmission drive 5. Input shaft 4 is connected, fixed in rotation, to spur gear 6. Spur gear 6 meshes with spur gear 8 which is loosely mounted on an output shaft 7 of transmission drive 5. Gear 8 is coupled in non-rotational manner to the output shaft 7 via a dog 8a in a manner known in the art.

Another spur gear 9 is connected, fixed in rotation, to the output shaft 7. Spur gear 9 engages with an end toothing 10 of a planet gear carrier 11 which forms part of a differential gearing unit 12. Differential gearing unit 12, which is constructed in the form of a planetary gearing system, serves for longitudinal equalization of the speed of rotation of two drive axles 13 and 14. Ring gear 15 and sun gear 19 comprise two rotatable driven members of differertial gear unit 12.

The ring gear 15 of the planetary gearing which comprises differential gearing unit 12 is connected via a hollow shaft 16 to housing 17 of a conventional differential gear 18 which is connected to first drive axle 13. This differential gear 18 carries a spur gear 26 which meshes with a pinion 27. Pinion 27 drives a set of plates 29 of fluid friction clutch 30.

Sun gear 19 of the planetary gearing system which comprises differential gearing unit 12, is connected, fixed in rotation, to spur gear 20. Spur gear 20 meshes with a pinion 22 which is mounted, in non-rotatable fashion on a shaft 21. Via a bevel drive 23, shaft 21 drives a cardan shaft 24. Shaft 24 drives the second drive axle 14 via a second conventional differential gear 25.

Spur gears 20 and 26 correspond to each other and are connected, in the aforementioned manner, to the two driven members, ring gear 15 and sun gear 19, of the planetary gear system which comprises differential gearing unit 12. Via the pinions 22 and 27, the two spur gears 20 and 26 are connected to the two sets of plates 28 and 29 which are coupled together in the fluid friction clutch 30. This fluid friction clutch acts as a brake for the differential gear unit 12 and equalizes rotation of the two drive axles 13 and 14.

As a result of the spur gear drive systems (20/22 and 26/27), the two sets of plates in the fluid friction clutch 30 are rotated at much higher speed than the driven members 15 and 19 of differential gearing unit 12. Furthermore, the fluid friction clutch is external from the differential gearing unit 12 and is easily replaceable.

While the invention has been described by reference to specific embodiments, this was for purposes of illustration only and should not be construed to limit the spirit or the scope of the invention.

What is claimed is:

1. A drive mechanism for a motor vehicle having first and second drive axles, comprising
    a transmission drive,
    a differential gear unit following said transmission drive, said differential gear unit including first and second driven members, said first driven member drivingly connected to said first drive axle and said second driven member drivingly connected to said second drive axle,
    a self-contained fluid friction clutch unit positioned outside of said differential gear unit and drivingly arranged between said first and second drive members, said fluid friction clutch unit including first and second torque transferring elements coupled to each other by fluid friction coupling with a torque which depends on the differential speed of rotation of said elements, and
    a gear system connecting said first driven member to said first torque transferring element and said second driven member to said second torque transferring element,
    said gear system being arranged so that said first and second torque transferring elements are rotated at a greater speed than said first and second driven members to enhance the coupling operation of said fluid friction clutch unit, and
    said fluid friction clutch unit being removable.

2. The drive mechanism of claim 1, wherein
    said gear system comprises a first spur gear drive system connected to said first torque transferring element, and a second spur gear drive system connected to said second torque transferring element, said first and second spur gear drive systems providing the same gear ratio,
    said first driven member being directly connected via a first shaft to a differential gear housing of the first drive axle, said differential gear housing being drivingly connected to said first spur gear drive system, said second driven member being drivingly connected to said second drive axle via said second spur gear drive system, a second shaft, a bevel gear drive, and a drive shaft, said first and second shafts being arranged transversely to the direction of travel of said motor vehicle.

3. The drive mechanism of claim 2, wherein said differential gear unit comprises a planetary gear system.

4. The drive mechanism of claim 2, wherein said first driven member is a ring gear and said second driven member is a sun gear.

5. The drive mechanism of claim 2, wherein said first and second torque transferring elements are sets of plates.

* * * * *